July 12, 1966    N. H. STARK    3,260,618
POLYURETHANE FOAM PRODUCT AND METHOD OF MAKING SAME
Original Filed Dec. 13, 1961
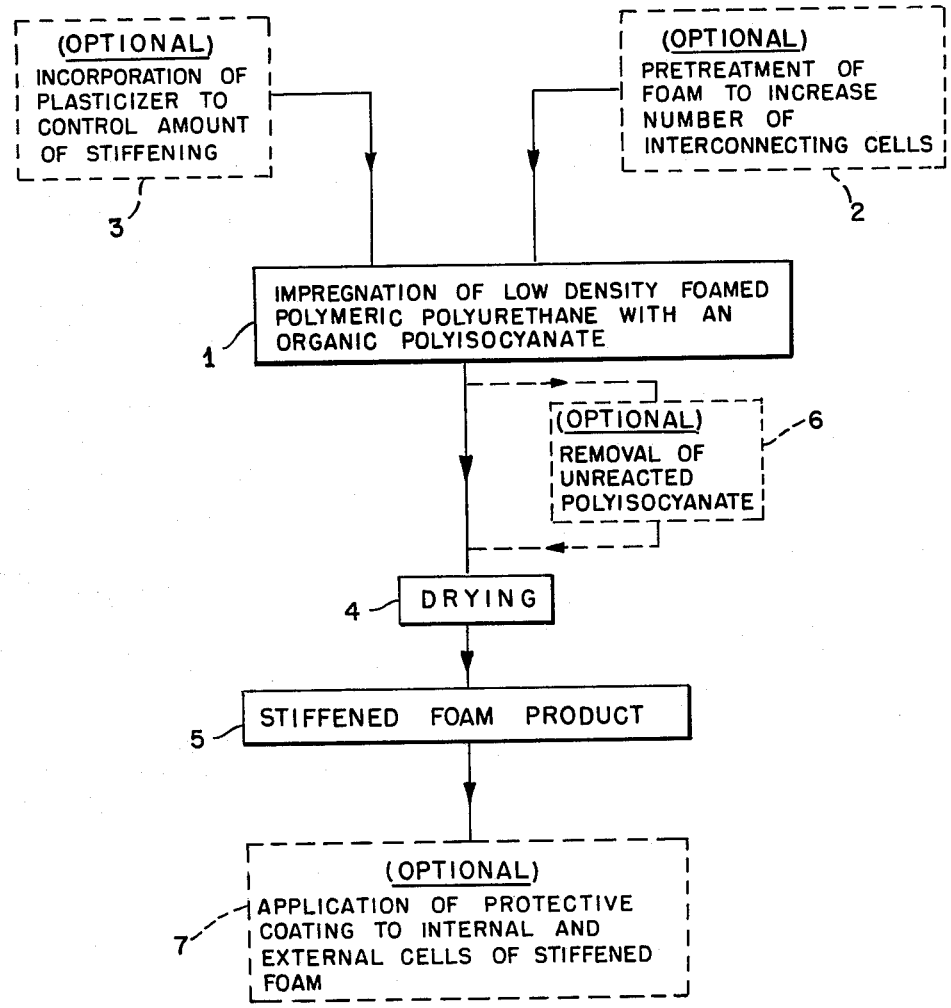
INVENTOR.
NORMAN H. STARK
BY
LAZO & BARRY
ATTORNEYS

United States Patent Office 3,260,618
Patented July 12, 1966

3,260,618
POLYURETHANE FOAM PRODUCT AND
METHOD OF MAKING SAME
Norman H. Stark, Mequon, Wis., assignor to Walker
Manufacturing Company, Racine, Wis.
Continuation of application Ser. No. 159,156, Dec. 13,
1961. This application Jan. 21, 1965, Ser. No. 446,443
7 Claims. (Cl. 117—102)

This is a continuation of patent application Serial Number 159,156, filed on December 13, 1961, now abandoned, by the present inventor.

This invention relates to the preparation, from manufactured foamed polymeric polyurethanes, of open-cell, cellular structures of improved chemical and physical characteristics and to the products obtained from this novel process. More particularly, it relates to novel open-cell, polyurethane foam and products made therefrom, having a selected structural rigidity, increased chemical resistance to environmental conditions, improved filtering characteristics, and having improved properties in the control of transmitted vibrations, and to the process of manufacturing same from ordinary polyurethane foam stock material.

It is known that foamed polymeric polyurethanes can be prepared with an open-cell or continuous cellular structure, that is, with at least a portion of the cells or voids making up the foam interconnecting. The preparation of these materials generally includes as one step the reacting of a polyglycol, for example, an alkyd resin, with an organic polyisocyanate to provide polymers characterized chemically by having recurring urethane linkages connecting linear units containing hydrocarbon groups of varying carbon content and chain lengths which may be interrupted by carboxylic ester, ether, or other stable linkages. During or subsequent to polyurethane polymer formation gas is caused to develop which results in foaming of the polymer. Such foamed polymeric products, generally referred to as polyurethane foams, have been fully described in detail in the voluminous literature relating to the field.

Heretofore, it has been discovered that the filtering properties of polyurethane foams can be greatly enhanced by treating the foam with a weakening agent capable of expanding the foam to weaken its cell wall structure and agitating the weakened foam by mechanically working the same to increase the number of interconnecting cells or voids therein, thereby providing a structure having uniform filtering characteristics and capable of passing an increased volume of fluid. Such a process has been fully described in United States Patent 2,961,710. Heretofore, apart from minor variations depending upon choice of ingredients, rigidity of manufactured foam has depended strictly on density, i.e. more dense foams being more rigid and less dense foams being more flexible. Accordingly, however, while it has been possible by means of the above process to enhance the filtering characteristics of manufactured foamed polymeric polyurethanes of various densities using aqueous solutions and organic solvents to weaken the foam, it has not been possible to produce a low density, open-cell, polyurethane foam having a high degree of structural rigidity.

It is the principal object of the present invention to provide novel open-celled, cellular structures, of the foamed polymeric polyurethane type, of low density which possess a selected degree of structural rigidity heretofore obtainable only with polyurethane foams of higher density.

Another object of the present invention is to provide as an article of manufacture a body of rigid, open-cell, polyurethane foam of density not in excess of 2.5 pounds per cubic foot.

A further object is to provide a simple method for modifying presently available cellular structures of foamed open-cell polymeric polyurethanes into foam products possessing a predetermined rigidity and improved resistance to chemical deterioration upon exposure to adverse environmental influences such as solvents, acids, alkali, oxygen, etc. It is a feature of the present invention that ordinary commercial grade (untreated) foamed polymeric polyurethane as is being presently manufactured can be treated in accordance with the instant process to open up the foam and then stiffen it to provide a novel foam product with tailor-made properties including filtering characteristics, density, resistance to environmental conditions, and structural rigidity.

It is an additional feature of the present invention that the low density, rigid, open-cell polyurethane foam has enhanced properties relating to the control of transmitted vibrations and electromagnetic energy, permitting a wide variety of uses not heretofore contemplated.

Other objects and advantages will become apparent from a consideration of the following specification and claims, when taken in conjunction with the accompanying drawing, wherein:

The figure illustrates diagrammatically an illustrative process embodying the present invention.

It should be understood that there is no intention to limit the invention to the specific forms and examples disclosed, but on the contrary, the invention covers all modifications, alternatives, equivalents, and uses falling within the spirit and scope of the invention as expressed in the appended claims.

In accordance with the present invention as exemplified by the foregoing objects, manufactured polyurethane stock, such as a conventional polyester or polyether foam is subjected to the action of an organic polyisocyanate to thereby modify selectively the physical properties of the foam. In general, any conventional foamed polymeric polyurethane stock material can be modified to impart thereto an increased rigidity. Preferably, however, the foam to be treated will have a polymeric cellular structure of cells formed by the expansion of gas bubbles to the point of contact so as to produce low density, open-cell, foam. Polyurethane foam of this type is well known and is generally referred to as open-celled because a portion of the faces of the cells have been ruptured during foaming so that the mass of cells are interconnected. It is a feature of the present invention that polyurethane foams of any density, for example, in the range of about three-quarters of a pound to seven or eight pounds per cubic foot or even higher, can be treated to produce structures having substantially greater rigidity than the untreated foam. Inasmuch as urethane foams of high density already have a degree of rigidity sufficient for most commercial applications, however, it is believed that the invention will find its greatest use with the less costly polyurethane foams of the lower densities, for example, in the range of about three-quarters to about two and one-half pounds per cubic foot. Particularly desirable starting materials are the polyether foams.

In accordance with the method of the present invention open-cell polyurethane foam stock material is subjected to the action of an organic polyisocyanate for a time sufficient to expand the foam as illustrated in the flow diagram as step 1. Thereafter any free organic polyisocyanate remaining in the foam can be removed (step 4) by evaporation at room temperature, for example, 20° to 40° C. or by heating the treated foam in an oven at moderate temperatures, for example, 160° F. Reduced pressure will assist the removal of excess organic polyisocyanate though it is not necessary.

In an alternative embodiment polyurethane foam is first treated in accordance with the process (designated step 2) of United States Patent 2,961,710 to increase the number of interconnecting cells or voids by soaking the foam in a weakening agent capable of expanding the foam to weaken its cell wall structure and mechanically working the weakened foam. The treated opened foam is thereafter stiffened by subjecting it to the action of an organic polyisocyanate in the manner described for raw untreated polyurethane foam. Bodies of foam treated by either process are extremely useful for filtering applications to remove solid particles entrained in a fluid. Specific examples of the utility of the products of the invention are air filters for internal combustion engines, for air conditioning systems, filters for liquid or gaseous fuel systems, and for anti-air pollution devices such as crankcase ventilation systems for the automotive industry. It is a particularly advantageous feature of the present invention that such products can be made from polyurethane foam which has been modified in accordance therewith to provide as an article of manufacture a rigid, open-cell, polyurethane foam of density not in excess of 2.5 pounds per cubic foot. By rigid, as used herein, is meant that the load required to compress the foam fifty percent (e.g., one inch foam compressed to one-half inch) of its original thickness is at least 0.28 pound per square inch. Rigid foams, accordingly, were those having a stiffness or rigidity in excess of that of average commonly available polyether polyurethane foams (untreated) having a density of under 2.5 pounds per cubic foot.

In another embodiment of the invention an article of manufacture is provided comprising an integral mass of open-cell, polyurethane foam in which one or more regions of the mass have a rigidity substantially in excess of the remainder of the mass. This can be accomplished, for example, simply by restricting the action of the polyisocyanate to a defined region of the polyurethane foam which is treated as by masking, etc.

Broadly, any organic polyisocyanate useful in the preparation of known isocyanate-derived polymers can be employed to impart rigidity in the foam-firming process of the present invention. Organic polyisocyanates utilized as foam-firming agents are generally diisocyanates, of the formula O=C=N—R—N=C=O wherein R is a hydrocarbon, including aromatic, aliphatic and cycloaliphatic diisocyanates and combinations of these types. Representative compounds include polymethylene diisocyanates such as ethylene diisocyanate, hexamethylene diisocyanate, tetramethylene, diisocyanate, and decamethylene diisocyanate; alkylene diisocyanates such as propylene-1,2-diisocyanate; cycloalkylene diisocyanates such as 1,4-diisocyanatocyclohexane; as well as aromatic diisocyanates such as m- and p-phenylene diisocyanate, toluene diisocyanate, p, p'-diphenyl diisocyanate 1,5-naphthalene diisocyanate, 2,4-tolylene diisocyanate, 4-chloro-1,3-phenylene diisocyanate, and the like. Aliphatic-aromatic diisocyanates such as p, p'-diphenylmethane diisocyanate and phenylethane diisocyanate are included in the latter category.

Triisocyanates are also suitable, such as those having isocyanate groups attached to a trivalent hydrocarbon radical, whether an aliphatic, aromatic or aliphatic-aromatic radical as in butane-1,2,2-triisocyanate, benzene-1,3,5-triisocyanate, diphenyl-2,4,6-triisocyanate, toluene-2,4,6-triisocyanate and triphenylmethane-4,4',4''-triisocyanate. Polyisocyanates derived from corresponding substituted hydrocarbon radicals such as monochlorobenzene-2,4,6-triisocyanate, can also be used.

Preferably, the organic polyisocyanates employed in the reaction will be arylene diisocyanates, that is, those in which each of the two isocyanate groups is attached directly to an aromatic ring. Such compounds are readily available commercially, easily handled and react rapidly in firming processes with both polymeric polyester and polyether polyurethane foams. Compounds such as toluene-2,4-diisocyanate, toluene-2,6-diisocyanate and isomeric mixtures of these (TDI) are particularly desirable and are available at low cost.

The organic polyisocyanates can be utilized in the pure state, liquid or vapor, or with a suitable inert solvent in concentrations through the range of about 0.5–100 percent by weight. Concentration below 0.5 weight percent of polyisocyanate are effective but are not usually employed where a substantial stiffening effect is desired. Solutions containing over 50 weight percent of the polyisocyanate may be desirable to impart maximum rigidity to the particular flexible foam treated and advantageously can be used particularly where a very hard product is needed. Understandably, such products have somewhat lower tensile strengths than those produced by treatment with more dilute solutions of polyisocyanate and it may be desirable to incorporate a suitable plasticizer with the firming agent during the process (designated step 3). Most advantageously, 0.5–25 weight percent solutions of polyisocyanate will be used in the present process. Such concentrations are sufficient to result in stiffened foam products containing up to 0.6 part of weight of combined organic polyisocyanate for each part by weight of untreated foam as shown by the weight of the final washed product.

By "inert" solvent is meant suitable solvents which will not react with the organic polyisocyanate itself. This eliminates water, aqueous solutions and hydrogen sulfide, as well as those organic compounds containing two and only two atoms of oxygen, nitrogen or sulfur in the molecule to which are attached active hydrogen atoms and which are used conventionally as chain extending agents in the production of isocyanate-derived polymers, e.g., ethylene glycol, hexamethylene glycol, diethylene glycol, adipic acid, terephthalic acid, adipamide, 1,2-ethanedithiol, hydroquinone, monoethanolamine, and 4-aminobenzoic acid, and the like. But otherwise, any of the weakening agents capable of expanding foamed polymeric polyurethane material in a process such as has been described in United States Patent 2,961,710 for making foam filters, can be used as a suitable solvent for the organic polyisocyanate. These organic liquids include both polar and non-polar compounds, for example, aliphatic hydrocarbons like hexane, heptane and octane; chlorinated hydrocarbons, e.g., chloroform, methyl chloride, carbon tetrachloride, and the like; ketones such as acetone, methyl ethyl ketone, cyclohexanone, diethyl ketone, and the like; the diethyl ether of ethylene glycol; benzene, toluene, nitrobenzene, o-dichlorobenzene, tetrachloroethane, thiophene, dimethyl-formamide, tetrahydrofuran, dioxane, methylene chloride, xylene, ethylene chloride, trichloroethylene, propylene dichloride, 2-nitropropane, methanol, ethanol, isopropyl alcohol, and the like. In each case the choice of solvent will depend to some extent, of course, upon solubility of the particular polyisocyanate used, industrial hazards associated with solvent handling, economics and availability of the material, volatility relating to ease of removal of solvent from the treated foam material and relative freedom from hygroscopic properties.

*Examples*

Representative samples of polyether and polyester urethane foam of various densities in the range of 1.3 to 2 pounds per cubic foot were subjected to the action of different organic diisocyanates including toluene diisocyanate and methylene bis(4-phenol isocyanate) at concentrations in the range of 2.5 to 100 weight percent by simply immersing the samples in the solutions of or in the pure polyisocyanate at room temperature and repeatedly compressing the sample until each was fully soaked and had undergone expansion and cell opening. Solvents employed in these experiments included toluene, methylchloride, chloroform, ethylene dichloride, trichloroethylene, propylene dichloride, isopropyl alcohol, 2-nitropropane, acetone and ethyl acetate. The time required for full expansion of the foam in contact with the organic polyisocyanate solutions was in all cases only a few minutes, e.g. 1–5. In a similar set of experiments samples of polyester and polyether polyurethane foams which had been previously "opened up" by mechanically working them in a weakening solution of propylene dichloride and samples of a polyether foam which had previously been "opened up" by mechanically working them in an aqueous caustic weakening solution, were treated with toluene diisocyanate in the manner disclosed above. All of the samples were thereafter air dried at room temperature for over one hundred hours or more throughout which time rigidity (compression) measurements were taken at regular intervals. In all cases the open cell polyurethane foams treated with the polyisocyanate were found to be substantially more rigid than the untreated samples. Rigidity of the treated product was determined to be proportional to the concentration of the TDI solution employed, that is, the amount of polyisocyanate combining with the polyurethane foam.

Rigidity measurements, in terms of load required to compress a standard sample to a fifty percent deflection from the original thickness dimension, were made in all cases using 4 x 4 x 1 inch pieces of polyurethane foam with a 4 x 4 inch metal compression plate and loading equipment to measure the force applied to reach 50% compression. Typical results with a 1.3 pound per cubic foot polyether foam using toluene diisocyanate—propylene dichloride stiffening solutions—are shown in Table I.

TABLE I.—AIR DRY CURING

| Time (hrs.) | Rigidity [1] of Open-Cell Foam | | | |
|---|---|---|---|---|
| | A | B | C | D |
| 0 | 17 | 17 | 17 | 17 |
| 2 | 12 | 14 | 16 | 19 |
| 5 | 14 | 17 | 20 | 28 |
| 10 | 16 | 21 | 25 | 37 |
| 15 | 19 | 24 | 29 | 43 |
| 20 | 21 | 27 | 33 | 48 |
| 30 | 25 | 31 | 39 | 55 |
| 40 | 28 | 35 | 44 | 60 |
| 50 | 30 | 38 | 47 | 63 |
| 60 | 31 | 40 | 51 | 66 |
| 70 | 32 | 42 | 53 | 69 |
| 80 | 33 | 43 | 55 | 71 |
| 90 | 33 | 44 | 57 | 73 |
| 100 | 33 | 44 | 58 | 74 |

[1] Load in ounces required to compress standard sample to a 50% deflection from original thickness dimension. Foam samples A, B, C, and D treated with propylene dichloride solutions of TDI at concentrations of 5, 10, 15, and 20 wt. percent respectively.

The above example clearly shows the production of opencell, polyurethane foam of selected rigidity prepared by the method comprising subjecting a mass of foamed polymeric polyurethane to the action of an organic polyisocyanate for a time sufficient to expand the foam and thereafter drying the product. Further, it can be seen from the above that maximum rigidity of the treated foam is directly proportional to the concentration of the polyisocyanate solution, for example, 31, 40, 51 and 66 ounces respectively, for samples measured 60 hours after immersion in TDI solutions at concentrations of 5, 10, 15 and 20 weight respectively. Higher concentrations of TDI result in more rigid foams, for example, the samples measured at 60 hours show rigidities of 81 and 87 ounces when impregnated with 30 and 40 percent TDI solutions respectively.

While the chemical reaction or reactions involved in the interaction of an organic polyisocyanate and a manufactured (fully aged) polyurethane foam are not as yet fully understood, it is clear that the combination of the polyisocyanate with the finished foam imparts a marked degree of structural rigidity to the foam. It is completely unexpected that the degree of rigidity can be increased selectively to such an extent without a proportionate increase in the overall density of the product. Further, it has been discovered that such increased rigidity can be obtained without significantly affecting the ability of the product to pass large volumes of air. Filters made from such stiffened foam are more easily fabricated and undergo less distortion in usage resulting in reduced channeling of fluid around the edges. Further, selective layer stiffening of the foam makes possible novel filter structures for better contact with filter frames.

Tensile strength studies on samples of stiffened foam show that increasing the concentration of the stiffening solutions results in an increased tensile strength up to in the range of about 50 to 12.5 percent polyisocyanate with gradually falling off tensile strengths observed with higher concentrations of the stiffening agent reaching a low at 100 percent polyisocyanate. In a typical experiment 2 x 4 x ½ inch samples of a polyether foam immersed in solutions of TDI of various concentrations and thereafter air dried showed tensile strengths varying from 52 ounces for the control to above 70 ounces for TDI solutions in the range of 5 to 12.5 percent.

In one embodiment of the present invention from about 5 to 50 weight percent, based on the weight of organic polyisocyanate, of a plasticizer compatible with such polyisocyanate is employed along with the polyisocyanate to cut back the rigidity imparted to the polyurethane foam stock to a lower predetermined rigidity. For example, solutions of 20 weight percent toluene diisocyanate with 5 weight percent tricresyl phosphate, 40 percent TDI with 15 percent tricresyl phosphate and 60 weight percent TDI with 25 weight percent tricresyl phosphate are effective firming agents with polyurethane foam where a high degree of acid resistance but less rigidity is required. In a typical experiment the load required to compress a standard sample of polyether foam fifty percent was 66 ounces after treatment with a 20 weight percent TDI solution and only 36 ounces for a foam treated with a 20 weight percent TDI solution and 5 weight percent of the plasticizer. Suitable plasticizers are those which are compatible with polyisocyanates such as TDI, for example, plasticizers used with polyester resins such as cresyl diphenyl phosphate, tricresyl phosphate, dibutyl phthalate, di(2 ethylhexyl)phthalate, diethyl adipate, dibutyl adipate, polypropyl adipate and the like. In some instances it may be desirable to use plasticizers having flame retardant properties.

Polyurethane foam products treated with an organic polyisocyanate in accordance with the present invention have been found to be substantially more resistant to acid and alkali than the untreated material. Further, it has been discovered that such resistance can be further increased by applying an organic coating material to internal and external cell surfaces of the stiffened foam (optional step 7). Suitable coating materials are those having a high degree of acid and/or alkali resistance or resistance to oxidizing agents. Representative materials are well known in the coating industry and include ethyl cellulose, nitro cellulose, chlorinated rubber, coumarone resins, epoxy resins, polyethylene resins, fluoroethylene resins, furan resins, hydrocarbon resins, melamine resins, phenolformaldehyde resins, urea formaldehyde resins, synthetic rubbers, silicone alkyl resins, silicone phenolic resin, styrene resin, styrene butadiene resin, terpene resin, vinyl chloride, vinyl chloride-vinyl acetate, waxes (parafin and microcrystalline), and the like.

The coating compositions are applied to the stiffened foam by immersing the foamed product in a solvent containing the coating composition and compressing and decompressing the sample until saturation occurs. Typically, the treated foam will be removed from the sample, run through a rubber mill to remove excess solution and dried, as, for example, in a convection oven at 150° F. for thirty minutes. In an alternative procedure, the coating material can be drawn into the internal cellular structure of the treated foam by removing the air therefrom in a vacuum apparatus, introducing by a suitable solution of coating composition and evaporating the solvent. In some instances it can be desirable to include a plasticizer with the coating composition in order to produce a coated foam which will return more quickly to its original dimensions upon compression. Suitable plasticizers are any plasticizer generally used in the coating industry with any of the above coating materials and can be used in amounts up to an amount equal to the weight of the coating composition.

One feature of the present invention which is also clearly shown in the above examples is the surprising versatility of the novel process providing a whole range of new polyurethane products having tailor-made properties in accordance with contemplated use. Foamed polyurethane of density in the range of 0.75 to 2.4 pounds per cubic foot treated in accordance with this invention results in a completely new class of compounds—namely rigid, open-cell polyurethane foam of density not in excess of 2.5 pounds per cubic foot. Higher density products of the invention have been prepared with a high predetermined degree of rigidity heretofore not possible with foams of equivalent densities, and foam of any desired density can be prepared with a selected degree of rigidity from lower cost, less dense manufactured foams. Control of the process is further evident from Table I wherein it is seen that after the polyurethane foam stock has been subjected to the action of an organic polyisocyanate (for a time sufficient to expand the foam, i.e. to saturate the foam with the organic polyisocyanate) the stiffening effect proceeds over a period of one hundred hours or more. It has been found that in the range of 60–80 hours is sufficient at room temperatures and atmospheric pressure for substantial completion of this reaction. At any time, however, the reaction can be stopped simply by washing out uncombined polyisocyanate as with a solvent, e.g. methyl alcohol, methylene chloride, propylene chloride, etc., to stop after a selected rigidity has been reached (optional step 6). Further washing of modified foam in which the stiffening reaction had gone to completion, showed no loss in weight and no loss of polyisocyanate which had combined with the foam stock material in a series of experiments with foams modified to permanent weight increases in the range of 1 to 60% due to combined polyisocyanate.

Comparison tests with untreated polyurethane foam, both polyester and polyether types, with stiffened foam modified by treatment with an organic polyisocyanate have shown that the stiffened foam is substantially more resistant to acids than the untreated foams. Results of typical experiments exemplifying increased acid resistance are given in Table II below. In these experiments 1⅝ inch circles of foam ½ inch thick were supported in a 37% hydrochloric acid solution at room temperature and subjected to the weight of a ½ inch diameter probe (approximately 75 grams). The penetration time of the probe through each sample was measured to accurately show the relative acid resistance of the various samples tested. Control samples were untreated polyester foam (density 2 pounds per cubic foot), polyether (1.2 to 1.5 pounds per cubic foot), the same polyester foam which had been treated with an aqueous (sodium hydroxide) weakening agent and the same polyether foam which had been treated with an organic (propylene dichloride) weakening agent. Stiffened foam of the present invention was a polyether (1.2–1.5 pounds per cubic foot) treated with toluene diisocyanate at various concentrations in propylene dichloride. For comparison the acid resistance of a stiffened polyether foam which had been coated in a 4% solution of 96% chloride-4% polyvinyl acetate copolymer in tetrahydrofuran is given.

TABLE II.—RESISTANCE TO HCl (37%)

Polyurethane foam: Penetration time (sec.)
Untreated polyester _____ 35
Polyester treated with aqueous weakening agent _____ 39
Polyether treated with organic weakening agent _____ 48

TABLE II—Continued

Polyurethane foam: Penetration time (sec.)
Untreated polyether _____ 51
Stiffened polyether (5% TDI) _____ 118
Stiffened polyether (10% TDI) _____ 189
Stiffened polyether (15% TDI) _____ 178
Stiffened polyether (20% TDI) _____ 180
Stiffened polyether (2.5% TDI) coated with polyvinyl chloridepolyvinyl acete copolymer (4%), in excess of 97 hours.

The above example clearly shows the increased acid resistance of polyurethane foams treated in accordance with the process of the present invention. In a similar set of experiments resistance to alkali was determined using a 17% solution of potassium hydroxide. While the control polyester and polyether (untreated) samples all ruptured in the range of from about 34 to 70 hours, there was no evidence of any kind after 100 hours that any of the stiffened products of this invention had been affected.

In another set of experiments the increased resistance to acids and solvents such as benzene, toluene, petroleum ether, and gasoline obtained by coating internal and external cells of the stiffened foam with conventional coating compositions was shown. In these experiments cylindrical samples (7/16 of an inch in diameter and ¾ of an inch high) were individually coated by being placed in a 400 mil beaker and covered with an excess of coating solution. The samples were compressed twenty times in the solution for one minute and then run through a rubber mill set at 100 mil opening. Coated samples were dried for one to two hours at 150–155° F. in a convection oven and the resin content calculated by measuring the increase in weight. The test samples were secured at one end on a glass disc on a long glass rod and on the other end to a glass cylinder weighing 70.5 grams using epoxy cement cured at 180° F. The samples were then suspended in tubes below the surface of the acid at 50° C. in a constant temperature bath and observed for breakage time (pressure to break equals one pound per square inch). Typical results are given below in Table III in which sample No. 1 was a 1.3 pound polyether foam stiffened by subjecting it to a 2.5% solution of TDI; sample No. 2 was the same treated foam as 1, except that it had been coated with a 1.25% solution of 96% polyvinyl chloride-4% polyvinyl acetate copolymer in tetrahydrofuran (resin content 11%) and sample No. 3 was the same treated foam as 1, except that it had been coated with a 5% solution of the copolymer (resin content 30%).

TABLE III.—RESISTANCE TO ACIDS-COATED FOAM

| Sample Tested | Time (Sec.) to Break in Acid at 50° C. (1 p.s.i.) | | | |
| --- | --- | --- | --- | --- |
| | HBr | HNO$_3$ | HCl | H$_2$SO$_4$ |
| 1 | (1) | (1) | (1) | (1) |
| 2 | | 15 | 120 | 45 |
| 3 | 2,400 | 120 | 1,320 | 660 |

[1] Less than 15 seconds.

The above example clearly shows the increased acid resistance obtained by applying a coating composition to polyurethane foams which have been stiffened by subjecting same to the action of an organic polyisocyanate. Typical tests in refluxing gasoline have shown that whereas untreated polyurethane foam will swell to about twice its original size in two hours that foam stiffened in accordance with the present invention and coated to a resin content of, for example, 30% exhibits slight or no swelling after eighteen hours.

It is to be understood that the above described stiffened foam products are but illustrative of the application of the principles of this invention and that the invention is not limited to the specific products and treating methods of the foregoing examples. For example, it has been found that the control of stiffness to mass ratio which can be achieved is beneficial for the control of transmitted vibrations of either a mechanical or acoustical nature and of electromagnetic energy. In one embodiment the cost of applying stiffened foam to an area for control of transmitted vibrations can be greatly decreased by grinding the treated foam and then blowing it against an adhesive surface which has been applied to the contour of the material to be coated. This process can be accomplished, for example, utilizing a two nozzle gun, one to spray the adhesive and the other to spray the stiffened foam ground to any desired size. Numerous other modifications may be devised by those skilled in the art without departing from the spirit and scope of the invention.

What is claimed is:

1. The method of making a rigid, open-cell, polyurethane foam product of density not in excess of 2.5 pounds per cubic foot which comprises impregnating a mass of foamed, open-cell, polymeric polyurethane capable of reaction with a monomeric organic polyisocyanate and having a density in the range of 0.75–2.4 pounds per cubic foot with a firming agent consisting essentially of a reactant selected from the class consisting of monomeric organic polyisocyanate and solutions of monomeric organic polyisocyanate, thereafter removing any free polyisocyanate from said foam, and reacting to form a stiffened open-cell foam product.

2. The method of stiffening cellular polymeric polyurethane material capable of reaction with a monomeric organic polyisocyanate, which comprises treating a body of open cell polyurethane foam with an impregnant consisting essentially of a monomeric organic polyisocyanate and thereafter drying the resultant product.

3. The method of claim 2 wherein the impregnant is a solution of a monomeric organic polyisocyanate in a suitable inert solvent.

4. The method of claim 3 wherein said foam containing said impregnant is worked mechanically to increase the number of interconnecting cells thereof.

5. The method of stiffening cellular polymeric polymethane material capable of reaction with a monomeric organic polyisocyanate, which comprises treating a body of open-cell polyurethane foam with an impregnant containing a plasticizer and a firming agent consisting essentially of a monomeric organic polyisocyanate.

6. The product prepared by the process of claim 2.

7. The product prepared by the process of claim 4.

References Cited by the Examiner

UNITED STATES PATENTS

| | | | |
|---|---|---|---|
| 2,905,582 | 9/1959 | Coleman et al. | 156—310 |
| 2,921,866 | 1/1960 | Wilson | 117—98 |
| 2,955,056 | 10/1960 | Knox. | |
| 2,961,710 | 11/1960 | Stark | 210—500 |
| 2,992,940 | 7/1961 | Pace. | |
| 3,029,208 | 4/1962 | Khawam. | |
| 3,188,302 | 6/1965 | Lorenz. | |
| 3,193,426 | 7/1965 | Schafer | 117—98 |

MURRAY KATZ, *Primary Examiner.*

JOSEPH B. SPENCER, *Examiner.*

A. H. ROSENSTEIN, *Assistant Examiner.*